(12) United States Patent
Nakaya

(10) Patent No.: US 9,004,111 B2
(45) Date of Patent: Apr. 14, 2015

(54) PLUG FOR CONNECTOR

(75) Inventor: Hiroyuki Nakaya, Yokosuka (JP)

(73) Assignee: Nifco Inc., Yokohama-Shi, Kanagawa (JP)

( * ) Notice: Subject to any disclaimer, the term of this patent is extended or adjusted under 35 U.S.C. 154(b) by 0 days.

(21) Appl. No.: 14/342,117

(22) PCT Filed: Aug. 31, 2012

(86) PCT No.: PCT/JP2012/072163
§ 371 (c)(1),
(2), (4) Date: Mar. 18, 2014

(87) PCT Pub. No.: WO2013/031948
PCT Pub. Date: Mar. 7, 2013

(65) Prior Publication Data
US 2014/0209200 A1    Jul. 31, 2014

(30) Foreign Application Priority Data
Sep. 2, 2011    (JP) .................... 2011-191755

(51) Int. Cl.
*F16L 55/11* (2006.01)
*F16L 37/14* (2006.01)

(52) U.S. Cl.
CPC .............. *F16L 55/11* (2013.01); *F16L 37/144* (2013.01); *F16L 2201/80* (2013.01)

(58) Field of Classification Search
CPC .. F16L 37/144; F16L 37/0987; F16L 37/0985
USPC ............ 138/89, 109; 285/305, 319, 317, 340, 285/921
See application file for complete search history.

(56) References Cited

U.S. PATENT DOCUMENTS

| 5,472,016 A * | 12/1995 | Szabo ............................ 138/89 |
| 5,951,063 A * | 9/1999 | Szabo ........................... 285/303 |
| 6,443,496 B2 * | 9/2002 | Campau .......................... 285/81 |
| 6,709,026 B2 * | 3/2004 | Sausner et al. ................. 285/305 |
| 6,757,950 B2 * | 7/2004 | Malone .......................... 29/235 |
| 8,113,547 B2 * | 2/2012 | Andre ........................... 285/319 |
| 2002/0053797 A1 * | 5/2002 | Vierneisel et al. ............ 285/305 |
| 2004/0093708 A1 * | 5/2004 | Malone ........................... 29/235 |
| 2006/0082144 A1 * | 4/2006 | Okada ........................... 285/305 |
| 2006/0134360 A1 * | 6/2006 | Inoue et al. ................ 428/36.91 |

FOREIGN PATENT DOCUMENTS

| JP | 2008-157408 A | 7/2008 |
| JP | 4198487 B2 | 10/2008 |
| JP | 2010-048400 A | 3/2010 |

OTHER PUBLICATIONS

PCT, International Search Report for PCT/JP2012/072163, Mar. 4, 2014.

\* cited by examiner

*Primary Examiner* — Patrick F Brinson
(74) *Attorney, Agent, or Firm* — Manabu Kanesaka

(57) ABSTRACT

A plug for a connector includes an insertion portion, and the insertion portion includes an O-ring abutment portion and a creep prevention portion. Also, when the insertion portion of the plug for a connector is inserted in a mouth portion of a connector, the O-ring abutting portion abuts against an O-ring mounted inside the connector, and closes the mouth portion of the connector. Also, the creep prevention portion prevents a creep of a lock member which is in a standby position.

5 Claims, 5 Drawing Sheets

PLUG FOR CONNECTOR

RELATED APPLICATIONS

The present application is National Phase of International Application No. PCT/JP2012/072163 filed Aug. 31, 2012, and claims priority from Japanese Application No. 2011-191755, filed Sep. 2, 2011.

FIELD OF TECHNOLOGY

The present invention relates to a plug for a connector inserted in a mouth portion of a connector used for a connection between both pipes for preventing a foreign material such as dust and the like from entering into the connector before the Connection.

BACKGROUND ART

Conventionally, as for the plug for a connector, there is, for example, Patent Document 1. In the conventional technology, an O-ring protection portion for protecting an O-ring mounted inside the connector is integrally provided with an interference portion interfering with a lock mechanism so as not to be locked by mistake.

PRIOR ART DOCUMENT

Patent Document

Patent Document 1: Japanese Patent No. 4198487

SUMMARY OF THE INVENTION

Problems to be Solved by the Invention

The present invention provides a plug for a connector which can prevent a foreign material from entering into the connector, can protect a foreign material from being attached to the O-ring and the like, and can prevent a creep of the lock mechanism provided in the connector.

Means for Solving the Problems

The first aspect of the present invention provides a plug for a connector comprising an insertion portion inserted in a mouth portion of a cylindrical connector including a lock mechanism moving between a standby position wherein a flange portion of a pipe can pass through, and a connected position wherein the flange portion of the pipe cannot pass through; an O-ring abutment portion formed in one portion of the insertion portion and abutting against an inner circumferential portion of an O-ring mounted inside the connector; and a creep prevention portion formed in another portion of the insertion portion for preventing a creep of the lock mechanism which is in the standby position.

In the aforementioned aspect, the insertion portion is inserted in the mouth portion of the cylindrical connector including the lock mechanism moving between the standby position wherein the flange portion of the pipe can pass through, and the connected position wherein the flange portion of the pipe cannot pass through. At that time, the O-ring abutment portion formed in one portion of the insertion portion of the plug for a connector abuts against the inner circumferential portion of the O-ring mounted inside the connector so as to close the mouth portion. Consequently, a foreign material can be prevented from entering into the connector before the pipe is connected so as to protect a foreign material from being attached to the O-ring and the like. Also, the creep prevention portion formed in another portion in the insertion portion of the plug for a connector prevents the creep of the lock mechanism which is in the standby position. Consequently, even if the plug for a connector is in a state mounted on the connector for many hours, when the plug for a connector is removed from the connector, the lock mechanism can be prevented from not returning to an original shape.

As for a second aspect of the present invention, in the first aspect of the present invention, the creep prevention portion may be a notch portion forming a notch for preventing interference with the lock mechanism.

In the aforementioned aspect, the creep prevention portion is the notch portion forming the notch for preventing the interference with the lock mechanism so as to prevent the interference with the lock mechanism which is in the standby position and to prevent the creep of the lock mechanism with a simplified structure.

As for a third aspect of the present invention, in the first aspect of the present invention, the creep prevention portion may be a thin shaft portion having an outer diameter smaller than that of the O-ring abutment portion.

In the aforementioned aspect, the creep prevention portion is the thin shaft portion having the outer diameter smaller than that of the O-ring abutment portion so as to prevent the interference with the lock mechanism which is in the standby position and to prevent the creep of the lock mechanism with a simplified structure.

As for a fourth aspect of the present invention, in any one of the first to third aspects of the present invention, the O-ring abutment portion may be a hollow shape.

In the aforementioned aspect, the O-ring abutment portion is the hollow shape, so that in a case wherein the plug for a connector is a resin formed article, a perfect circle can be easily formed. As a result, since the O-ring abutment portion becomes a perfect circle, the O-ring abutment portion evenly abuts against the O-ring so as to improve a sealing characteristic of the O-ring abutment portion.

As for a fifth aspect of the present invention, in any one of the first to fourth aspects of the present invention, a grip portion may be included in an end portion of the insertion portion.

In the aforementioned aspect, the grip portion is included in the end portion of the insertion portion, so that when the plug for a connector is attached to the connector or removed from the connector, workability improves by gripping the grip portion.

Effect of the Invention

The first aspect of the present invention has the aforementioned structure so as to prevent a foreign material from entering into the connector, to protect a foreign material from being attached to the O-ring and the like, and to prevent the creep of the lock mechanism provided in the connector.

The second aspect of the present invention has the aforementioned structure so as to prevent the creep of the lock mechanism provided in the connector with a simplified structure.

The third aspect of the present invention has the aforementioned structure so as to prevent the creep of the lock mechanism provided in the connector with a simplified structure.

The fourth aspect of the present invention has the aforementioned structure so as to improve the sealing characteristic of the O-ring abutment portion.

The fifth aspect of the present invention has the aforementioned structure so as to improve attaching or removing workability.

BEST MODES OF CARRYING OUT THE INVENTION

First Embodiment

Next, the first embodiment of a plug for a connector of the present invention will be explained according to FIG. 1 to FIG. 7.

Incidentally, in figures, the same symbols are assigned to members (structure elements) having the same or corresponding functions, and their explanations are arbitrarily omitted.

Figure 1:
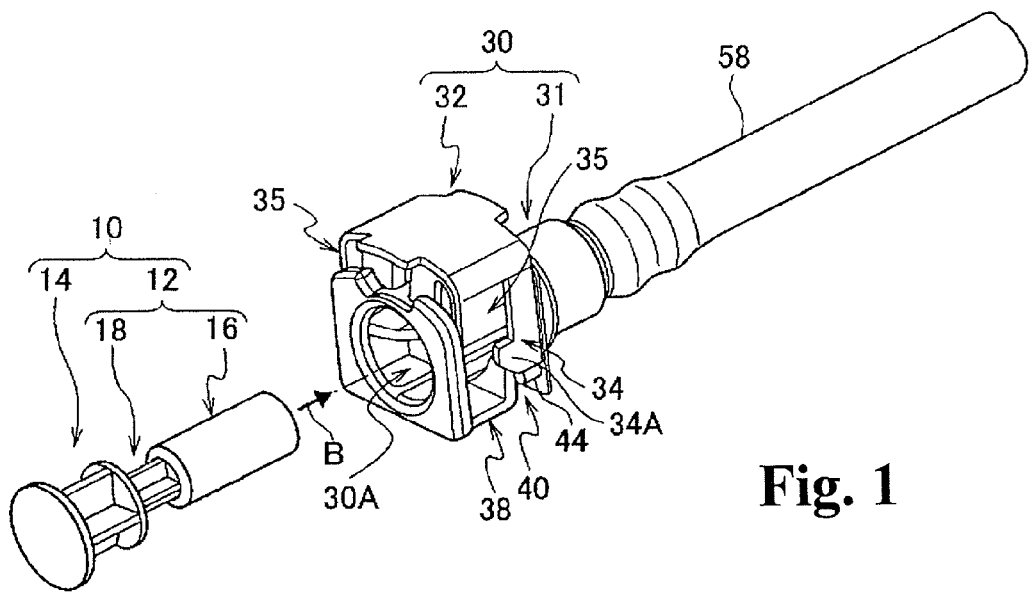
FIG. 1 is a perspective view showing a state before an insertion of a plug for a connector to a connector according to the first embodiment of the present invention.

As shown in FIG. 1, a plug for a connector (an insertion apparatus for a connector) 10 of the present embodiment has a long shape. Also, the plug for a connector 10 comprises an insertion portion 12 inserted in a mouth portion 30A of a connector 30 along a longitudinal direction; and a grip portion 14 where an operator grips at an operation time. The insertion portion 12 of the plug for a connector 10 includes an O-ring abutment portion 16 and a creep prevention portion 18 along the longitudinal direction, and the creep prevention portion 18 is formed between the grip portion 14 and the O-ring abutment portion 16. Incidentally, the O-ring abutment portion 16 of the plug for a connector 10 has a cylindrical shape having approximately the same diameter as an outer diameter of a pipe 50 shown in FIG. 5.

Figure 3:
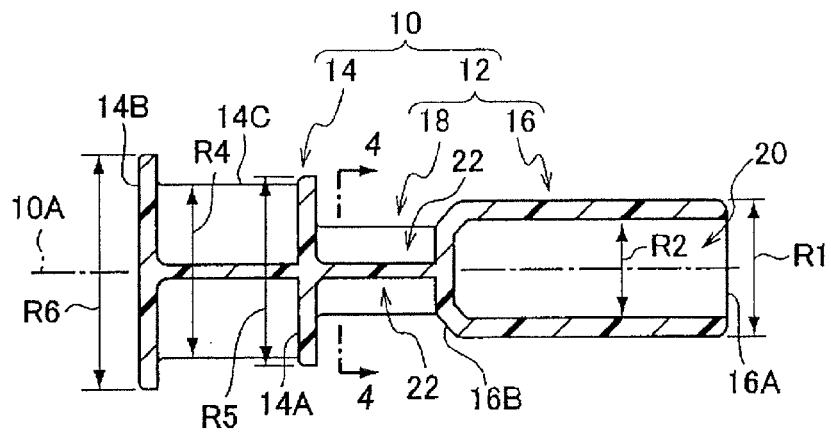
FIG. 3 is a side cross-sectional view showing the plug for a connector according to the first embodiment of the present invention.

As shown in FIG. 3, the O-ring abutment portion 16 of the plug for a connector 10 has a hollow shape with an outer diameter R1. Namely, in the O-ring abutment portion 16, there is formed a concave portion 20 having a cross-sectional circular shape with a diameter R2 along a shaft line 10A of the plug for a connector 10 from an end 16A.

Figure 4:
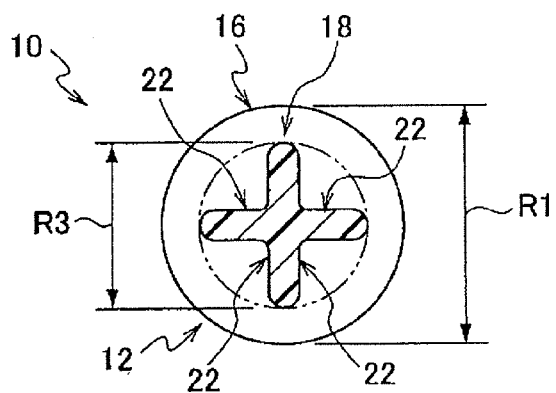
FIG. 4 is a cross-sectional view taken along a cross-sectional line 4-4 in FIG. 3.
Figure 7:
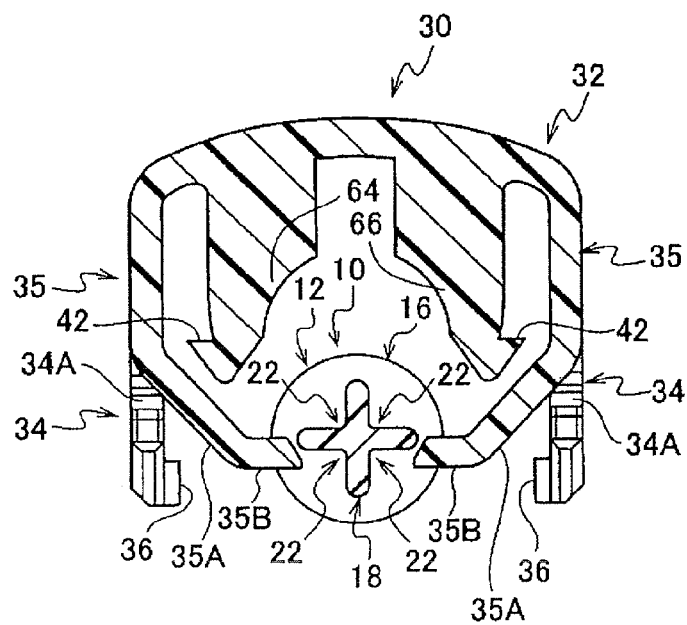
FIG. 7 is a cross-sectional view taken along a cross-sectional line 7-7 in FIG. 6.

As shown in FIG. 4, the creep prevention portion 18 of the plug for a connector 10 has notch portions with a cross shape in a cross section. Namely, the creep prevention portion has the notch portions with the cross shape in a cross section, forming four notches 22 having a fan shape in a cross section in a cylinder portion having a shaft diameter R3 smaller than a shaft diameter R1 of the O-ring abutment portion 16 (R3<R1). Consequently, as shown in FIG. 7, when the plug for a connector 10 is inserted in the mouth portion 30A of the connector 30, the creep prevention portion 18 prevents the insertion portion 12 from interfering with elastic pieces 35 in a lock member 32 (a lock mechanism) as the lock mechanism which is in a standby position of the connector 30.

Figure 2:
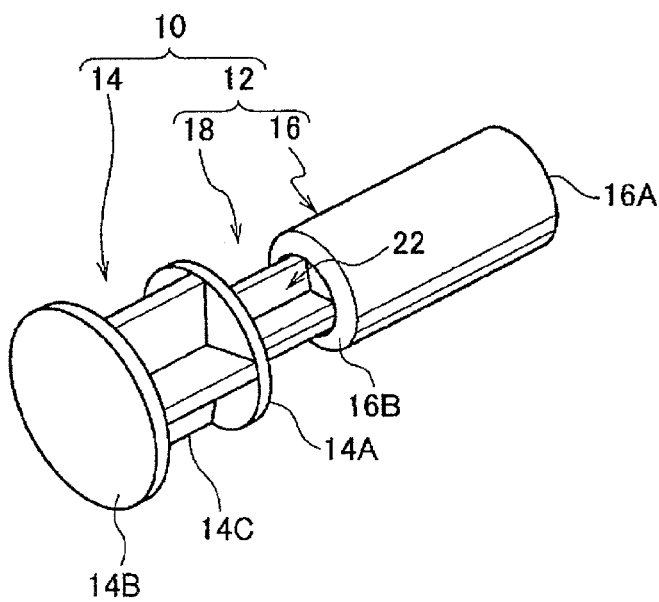
FIG. 2 is an enlarged perspective view showing the plug for a connector according to the first embodiment of the present invention.

As shown in FIG. 2, in the grip portion 14 of the plug for a connector 10, both end portions 14A and 14B have a circular plate shape, and an intermediate portion 14C connecting both end portions 14A and 14B has a cross shape in a cross section.

As shown in FIG. 3, a shaft diameter R4 of the intermediate portion 14C of the grip portion 14 is larger than the shaft diameter R1 of the O-ring abutment portion 16, and a shaft diameter R5 of the end portion 14A on a creep prevention portion 18 side is larger than the shaft diameter R4 of the intermediate portion 14C. Also, a shaft diameter R6 of the other end portion 14B is larger than the shaft diameter R5 of the end portion 14A on the creep prevention portion 18 side (R1<R4<R5<R6).

(Connector Structure)

Figure 5:
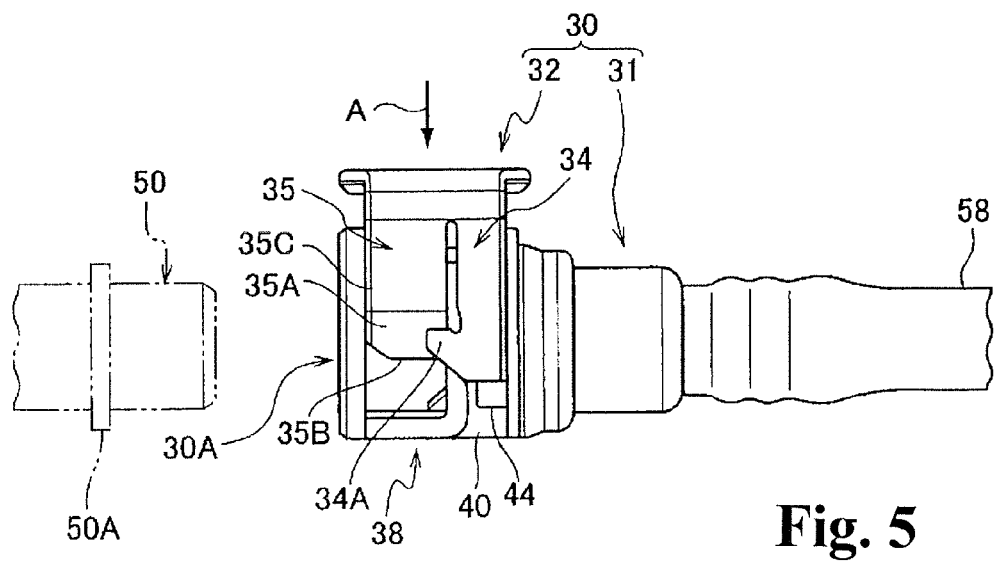
FIG. 5 is a side view showing a connector in which the plug for a connector according to the first embodiment of the present invention is used.

Next, an example of the connector, into which the plug for a connector 10 of the present embodiment is inserted, will be briefly explained according to FIG. 5 and FIG. 7.

As shown in FIG. 5, the connector 30 includes a connector main body 31 and the lock member 32. Also, the lock member 32 can move between the standby position (a position shown in FIG. 5) wherein a flange portion 50A of the connected pipe 50 can pass through, and a connected position (a lock position) wherein the lock member 32 moves in an arrow A direction in FIG. 5 from the standby direction and the flange portion 50A of the pipe 50 cannot pass through.

As shown in FIG. 7, in the lock member 32 of the connector 30, there are provided a pair of locking pieces 34 and a pair of elastic pieces 35. In portions wherein end portions of the respective locking piece 34 face, there are respectively formed locking portions 36 to protrude. Also, end portions 35A of the respective elastic pieces 35 incline in a direction mutually approaching, and ends 35B are bent in a direction mutually approaching. Moreover, in portions facing the ends 35B of the respective elastic pieces 35 in the lock member 32, there are provided stoppers 64 and 66.

As shown in FIG. 5, in a lock portion 40 of a connection portion 38 of the connector main body 31, there is provided a protruding portion 44. Then, in the standby position of the lock member 32 shown in FIG. 5, the locking portions 36 (see FIG. 7) of the lock member 32 abut against the protruding portion 44 of the connector main body 31 so as not to move in a direction of the connected position (the arrow A direction in FIG. 5). Also, in the standby position, a pair of claw portions 42 formed in the lock member 32 (see FIG. 7) engages with an engagement portion on a connector main body 31 side so as not to move in a direction of coming out of the connector main body 31 (an opposite direction to an arrow A in FIG. 5).

Next, when the pipe 50 is inserted in the mouth portion 30A of the connector 30, each elastic piece 35 is expanded in a radial direction by an outer circumferential portion of the pipe 50. Then, when the pipe 50 is inserted in the mouth portion 30A of the connector 30 up to a predetermined position, each elastic piece 35 hits a convex portion 34A of each locking piece 34 so as to expand each locking piece 34 in the radial direction, so that the locking portion 36 climbs over the protruding portion 44, and the lock member 32 can move to the connected position. Also, a flexure of each elastic piece 35 returns in such a way as to follow the outer circumferential portion of the pipe 50, so that the lock member 32 automatically moves to the connected position, and the stoppers 64 and 66 approach the outer circumferential portion of the pipe 50. Also, each locking portion 36 of the lock member 32 is disposed on a lower side of the protruding portion 44 of the connector main body 31. Consequently, in a case wherein the pipe 50 has moved in a pull-out direction, the stoppers 64 and 66 abut against the flange portion 50A of the pipe 50 so as to prevent the pipe 50 from coming out of the connector 30.

(Mounting Plug for Connector to Connector)

As shown in FIG. 1, the insertion portion 12 of the plug for a connector 10 is placed on a front end side in an insertion direction (an arrow B direction in FIG. 1), and the plug for a connector 10 is inserted in the mouth portion 30A of the connector 30. At that time, an operator grips the grip portion 14 of the plug for a connector 10.

Figure 6:
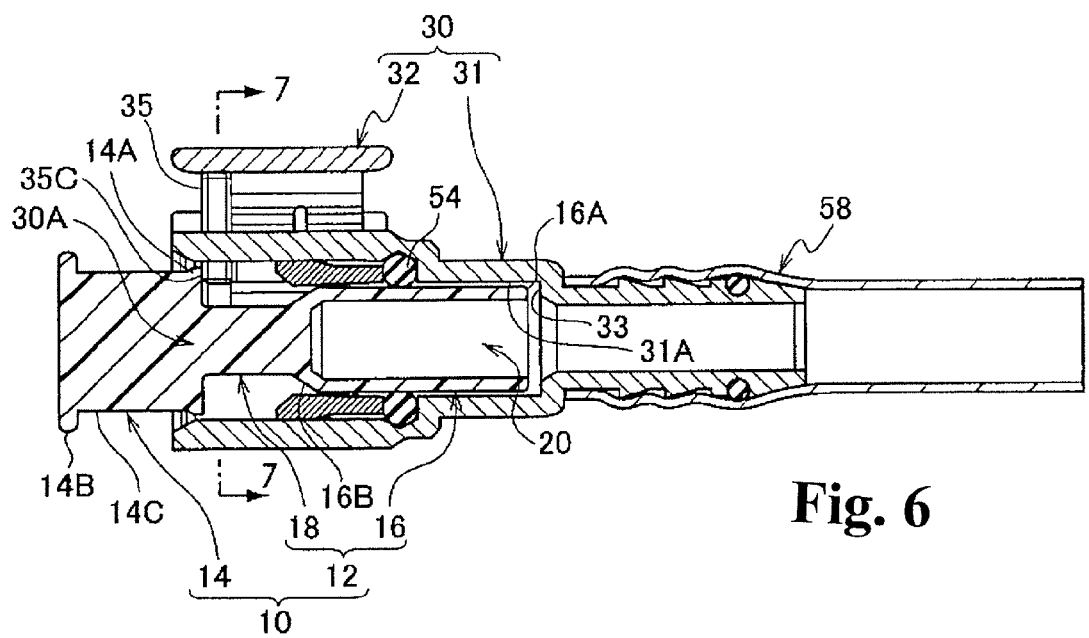
FIG. 6 is a side cross-sectional view showing an inserted state of the plug for a connector to the connector according to the first embodiment of the present invention.

As shown in FIG. 6, when the insertion portion 12 of the plug for a connector 10 is inserted in the mouth portion 30A of the connector 30, the end portion 14A on the creep prevention portion 18 side in the grip portion 14 of the plug for a connector 10 abuts against a lateral face 35C of the elastic piece 35 in the lock member 32 of the connector 30. Consequently, a movement in the insertion direction into the connector 30 of the plug for a connector 10 halts, and the plug for a connector 10 halts at an insertion position (a position in FIG. 6). Also, the plug for a connector 10 may be formed such that the end 16A of the O-ring abutment portion 16 of the plug for a connector 10 abuts against a step portion 33 of an inner wall 31A of the connector main body 31 so as to halt the plug for a connector 10 at the insertion position.

As shown in FIG. 3, a base portion of the O-ring abutment portion 16 of the plug for a connector 10 becomes an inclined face 16B. Consequently, the plug for a connector 10 which is in the insertion position (the position in FIG. 6) is pulled out in a direction opposite to the insertion direction, so that the plug for a connector 10 can be removed from the mouth portion 30A of the connector 30.

(Operation and Effect)

Next, an operation and an effect of the present embodiment will be explained.

In the present embodiment, when the insertion portion 12 of the plug for a connector 10 is inserted in the mouth portion 30A of the connector 30, and the plug for a connector 10 comes to the insertion position (the position in FIG. 6), the O-ring abutment portion 16 of the plug for a connector 10 abuts against an inner circumferential portion of an O-ring 54 mounted inside the connector 30 so as to close the mouth portion 30A of the connector 30. Consequently, a foreign material can be prevented from entering into the connector 30 before the pipe 50 is connected so as to protect a foreign material from being attached to the O-ring 54 and the like.

Also, as shown in FIG. 7, the creep prevention portion 18 of the plug for a connector 10 has the notch portions with the cross shape in a cross section, forming the four notches 22 having a fan shape in cross section, in the cylinder portion having the shaft diameter R3 smaller than the shaft diameter R1 of the O-ring abutment portion 16 (R3<R1). Therefore, when the insertion portion 12 of the plug for a connector 10 is inserted in the mouth portion 30A of the connector 30, the creep prevention portion 18 prevents the insertion portion 12 from interfering with the elastic piece 35 in the lock member 32 which is in the standby position of the connector 30. Consequently, even if the plug for a connector 10 is in a state mounted on the connector 30 for many hours, a creep of the elastic piece 35 can be prevented. As a result, when the plug for a connector 10 is removed from the connector 30, the elastic piece 35 cannot be prevented from returning to an original shape.

Therefore, when the pipe 50 is inserted in the mouth portion 30A of the connector 30 up to the predetermined position, a flexure of each elastic piece 35 returns in such a way as to follow the outer circumferential portion of the pipe 50, so that the lock member 32 automatically moves to the connected position. Consequently, in the case wherein the pipe 50 has moved in the pull-out direction, the stoppers 64 and 66 abut against the flange portion 50A of the pipe 50 so as to prevent the pipe 50 from coming out of the connector 30. As a result, an incomplete connection between the connector 30 and the pipe 50 can be prevented.

Also, as shown in FIG. 6, in the plug for a connector 10 of the present embodiment, the O-ring abutment portion 16 has the hollow shape forming the concave portion 20 having the cross-sectional circular shape. Consequently, in a case wherein the plug for a connector 10 is a resin formed article, a perfect circle can be easily formed. As a result, since the O-ring abutment portion 16 becomes a perfect circle, the O-ring abutment portion 16 evenly abuts against the O-ring 54 so as to improve a sealing characteristic of the O-ring abutment portion 16.

Also, as shown in FIG. 1, the plug for a connector 10 of the present embodiment includes the grip portion 14. Consequently, when the plug for a connector 10 is attached to the connector 30 or is removed from the connector 30, an operator grips the grip portion 14 so as to improve workability. Also, the plug for a connector 10 includes the grip portion 14 so as to prevent an attachment mistake in an opposite direction in which a grip portion 14 side is inserted in the connector 30.

Also, as shown in FIG. 4, in the plug for a connector 10 of the present embodiment, the creep prevention portion 18 has the notch portions with the cross shape in a cross section, forming the four notches 22 with the fan shape in a cross section in the cylinder portion having the shaft diameter R3 smaller than the shaft diameter R1 of the O-ring abutment portion 16 (R3<R1). As a result, a structure of the plug for a connector 10 is simplified so as to improve productivity of the plug for a connector 10.

Second Embodiment

Next, a second embodiment of the plug for a connector of the present invention will be explained according to FIG. 8 and FIG. 9.

Incidentally, the same symbols are assigned to the same members as the first embodiment, and their explanations are omitted.

Figure 8:
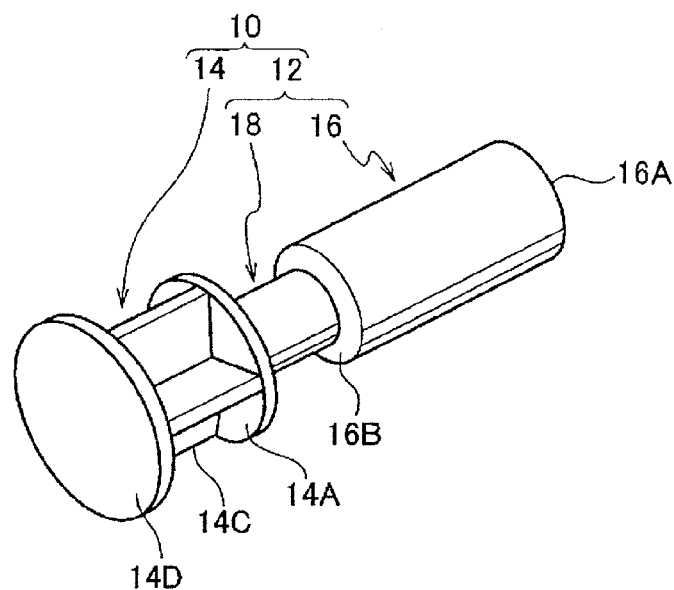
FIG. 8 is an enlarged perspective view showing the plug for a connector according to a second embodiment of the present invention.

As shown in FIG. 8, in the plug for a connector 10 of the present embodiment, the creep prevention portion 18 has a thin shaft portion having a circular cross-sectional shape. Namely, as shown in FIG. 9, in the plug for a connector 10 of the present embodiment, a shaft diameter R7 of the creep prevention portion 18 is smaller than the shaft diameter R1 of the O-ring abutment portion 16 (R7<R1), so that the creep prevention portion 18 docs not interfere with the ends 35B of the elastic pieces 35 in the lock member 32 which is in the standby position.

Therefore, the present embodiment can obtain the same operational effect as the first embodiment.

Third Embodiment

Next, a third embodiment of the plug for a connector of the present invention will be explained according to FIG. 10.

Incidentally, the same symbols are assigned to the same members as the first embodiment, and their explanations are omitted.

Figure 10:
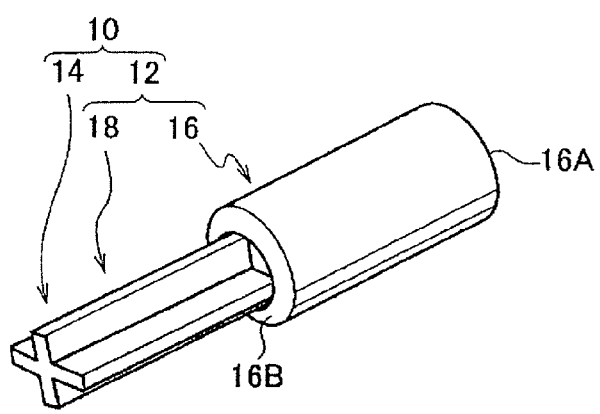
FIG. 10 is an enlarged perspective view showing the plug for a connector according to a third embodiment of the present invention.

As shown in FIG. 10, in the present embodiment, a shape of the grip portion 14 in the plug for a connector 10 of the first embodiment has a structure having the same shape as the creep prevention portion 18.

Therefore, in the present embodiment, compared to the first embodiment, a shape of the plug for a connector 10 is simplified so as to further improve the productivity.

Figure 9:
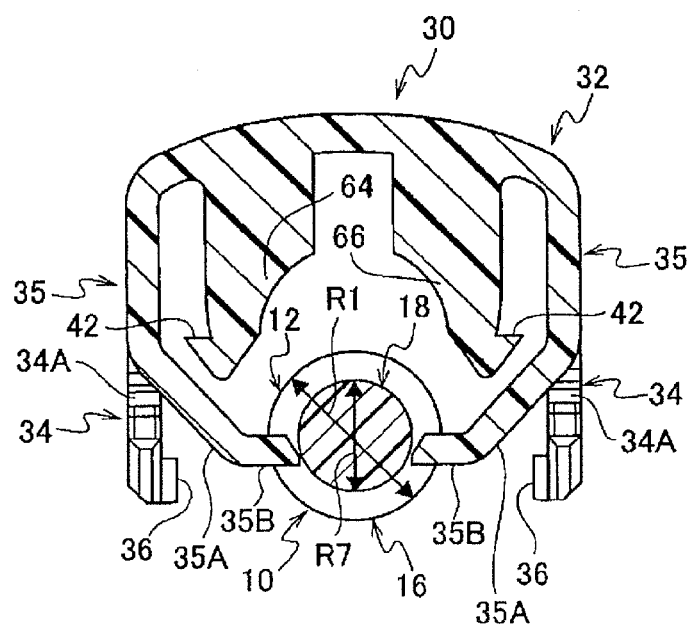
FIG. 9 is a cross-sectional view showing the plug for a connector according to the second embodiment of the present invention, and corresponding to FIG. 7.

Incidentally, the grip portion 14 in the plug for a connector 10 of the second embodiment shown in FIG. 8 and FIG. 9 may have a structure having the same shape as the creep prevention portion 18.

Also, there may be used a structure wherein the grip portion 14 is not provided in the plug for a connector 10.

Other Embodiments

Although the specific embodiments of the present invention have been explained in detail hereinabove, the present invention is not limited to each embodiment described hereinabove, and it is obvious for one skilled in the art that other various embodiments can be made within a range of the present invention. For example, in each embodiment described hereinabove, the cross-sectional surface of the creep prevention portion 18 has a cross shape or a circular shape. However, the cross-sectional surface of the creep prevention portion 18 is not limited to the cross shape or the circular shape, and may be other shapes such as a triangle, a square, or the like. Furthermore, a material of the creep prevention portion 18 may be formed by a material which is more deformable than other portions of the insertion portion 12 and the lock member 32, and the creep prevention portion 18 may have a structure preventing a creep of the lock member 32 by deforming by itself when the creep prevention portion 18 abuts against the lock member 32 which is in the standby position.

Also, the shape of the grip portion 14 of the plug for a connector 10 is also not limited to the shape of each embodiment described hereinabove.

Also, in each embodiment, the O-ring abutment portion 16 of the plug for a connector 10 has the hollow shape. However, in place of that, the O-ring abutment portion 16 of the plug for a connector 10 may have a solid shape.

What is claimed is:

1. A plug for a connector, comprising:
    an insertion portion adapted to be inserted in a mouth portion of a cylindrical connector including a lock mechanism moving between a standby position wherein a flange portion of a pipe can pass through, and a connected position wherein the flange portion of the pipe cannot pass through;
    the insertion portion including an O-ring abutment portion formed in one end portion thereof and adapted to abut against an inner circumferential portion of an O-ring mounted inside the connector, the O-ring abutment portion including a hollow cylindrical shape having a concave portion with a circular shape in a cross section thereof; and a creep prevention portion for preventing a creep of the lock mechanism which is in the standby position, connected to the O-ring abutment portion and having an outer diameter smaller than that of the O-ring abutment portion for preventing interference with the lock mechanism; and
    a grip portion connected to the creep prevention portion such that the creep prevention portion is arranged between the O-ring abutment portion and the grip portion, and having two circular plate portions at two end portions thereof with a diameter greater than that of the O-ring abutment portion and an intermediate portion extending between the two circular plate portions.

2. A plug for a connector according to claim 1, wherein the creep prevention portion includes a notch portion forming a notch.

3. A plug for a connector according to claim 1, wherein the creep prevention portion includes a thin shaft portion.

4. A plug for a connector according to claim 1, wherein the creep prevention portion has a cross shape portion in a cross section thereof, and has the outer diameter smaller than those of the two circular plate portions.

5. A plug for a connector according to claim 4, wherein the grip portion has a cross shape portion in a cross section thereof, and one of the two circular plate portions connecting the creep prevention portion has an outer diameter larger than that of the O-ring abutment portion and smaller than that of another of the two circular plate portions.

* * * * *